(12) United States Patent  (10) Patent No.: US 8,496,887 B2
Arstad  (45) Date of Patent: Jul. 30, 2013

(54) FLUORIDE DRYING APPARATUS

(75) Inventor: Erik Arstad, London (GB)

(73) Assignee: Hammersmith Imanet Limited, London (GB)

( * ) Notice: Subject to any disclaimer, the term of this patent is extended or adjusted under 35 U.S.C. 154(b) by 0 days.

(21) Appl. No.: 13/429,824

(22) Filed: Mar. 26, 2012

(65) Prior Publication Data

US 2012/0186969 A1  Jul. 26, 2012

Related U.S. Application Data

(62) Division of application No. 12/375,559, filed as application No. PCT/GB2007/002848 on Jul. 25, 2007, now Pat. No. 8,163,039.

(60) Provisional application No. 60/821,282, filed on Aug. 3, 2006.

(51) Int. Cl.
*A61L 9/00* (2006.01)
(52) U.S. Cl.
USPC .......................................... 422/305; 422/68.1
(58) Field of Classification Search
USPC ................... 422/68.1, 544, 546, 305
See application file for complete search history.

(56) References Cited

U.S. PATENT DOCUMENTS

| 2002/0155063 A1 | 10/2002 | Wilson et al. |
| 2003/0124059 A1 | 7/2003 | Tanaka et al. |

FOREIGN PATENT DOCUMENTS

| WO | 01/87235 | 11/2001 |
| WO | 03/065882 | 8/2003 |
| WO | 2005/061110 | 7/2005 |

OTHER PUBLICATIONS

Guillaume, M. et.al. "Recommendations for fluorine-18 production" International Journal of Radiation Applications and Instrumentation Part A: Applied Radiation and Isotopes, Pergamon Press, Ltd., Exeter, GB. vol. 42, No. 8, Jan. 1991, pp. 749-762.
Grierson, J.R., et.al. "Radiosynthesis of 3'-deoxy-3'-[<18>F]fluorothymidine: [<18>F]FLT for imaging of cellular proliferation in vivo" Nuclear Medicine andbiology, Elsevier, NY, US, vol. 27, No. 2, Feb. 2000, pp. 143-156.
Brodack, et.al. "NCA 16 alpha-[18F]Fluoroestradiol-17beta: the effect of reaction vessel on fluorine-18 resolubilization, product yield, and effective specific activity" Appl. Radiat. Isot., vol. 37, 1986.
GB0615351.4 Search Report dated Nov. 2006.
PCT/GB2007/002848 Int'l Search Report/Written Opinion dated Dec. 2007.

*Primary Examiner* — Edward Johnson

(57) ABSTRACT

The invention relates to methods and apparatus for drying [$^{18}$F]fluoride which comprises (i) passing a [$^{18}$F]fluoride solution comprising water, a solvent, [$^{18}$F]fluoride, and a cationic counterion through a narrow bore vessel at elevated temperature such that the water and solvent are vaporised forming a vaporised component, and (ii) collecting the resulting vaporised component by condensing into a collection vessel.

3 Claims, 1 Drawing Sheet

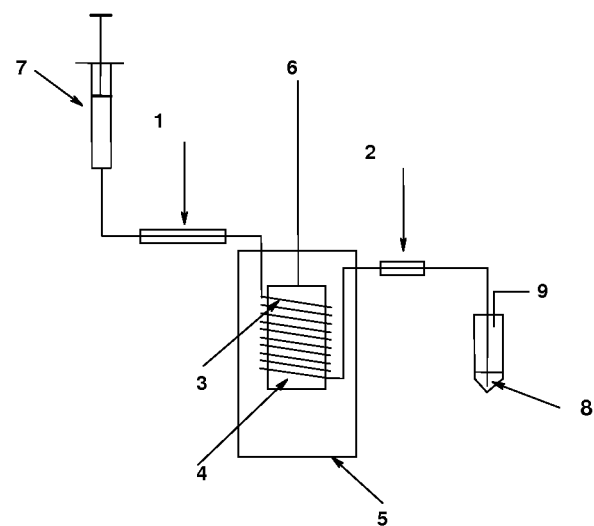
Scheme of the distillation apparatus

FLUORIDE DRYING APPARATUS

This application is a divisional application of co-pending application Ser. No. 12/375,559 filed Jan. 29, 2009, which in turn is a filing under 35 U.S.C. 371 of international application number PCT/GB2007/002848, filed Jul. 25, 2007, which claims priority to application No. 60/821,282 filed Aug. 3, 2006, in The United States, the entire disclosure of each of which is hereby incorporated by reference.

The present invention relates to a method for drying [$^{18}$F] fluoride and to apparatus for performing such a method.

[$^{18}$F]Fluoride is generally produced as an aqueous solution, by irradiation of a [$^{18}$O]water target. In aqueous form, [$^{18}$F]fluoride is relatively unreactive and so several steps are required to provide a reactive nucleophilic reagent. Firstly, a cationic counterion is added, rubidium, cesium, and tetraalkylammonium salts have been used, more commonly potassium complexed by a cryptand such as 4,7,13,16,21,24-hexaoxa-1,10-diazabicyclo [8,8,8] hexacosan (tradename Kryptofix 222). This step is often performed by adsorbing the target water containing [$^{18}$F]fluoride on an anion exchange resin and eluting with an aqueous solution of the chosen cation, for example an aqueous solution of potassium carbonate with Kryptofix (Schlyer et al. Appl. Radiat. Isot., 1990, vol 40, pp 1-6). Secondly, the fluoride ion has to be dried. This step is commonly done by azeotroping the aqueous solution with a solvent such as acetonitrile—which is straightforward and relatively efficient. However, in the context of a radiosynthesis, it is important to minimise reaction times to avoid unnecessary decay of the radioisotope. $^{18}$F has a half-life of 110 minutes and $^{18}$F-labelled tracers for PET are therefore synthesised and purified within one hour of clinical use. The azeotroping step typically takes from 8 to 10 minutes in an automated radiosynthesis.

Thus, there exists a need for new methods for drying [$^{18}$F] fluoride which are rapid and efficient, particularly for methods which are susceptible to automation and can be incorporated into or used in conjunction with automated radiosynthesis apparatus.

According to the invention, there is provided a method for drying [$^{18}$F]fluoride which comprises (i) passing a [$^{18}$F]fluoride solution comprising water, a solvent, [$^{18}$F]fluoride, and a cationic counterion through a narrow bore vessel at elevated temperature such that the water and solvent are vaporised forming a vaporised component, and (ii) collecting the resulting vaporised component by condensing into a collection vessel.

In contrast to the [$^{18}$F]fluoride drying methods described in the prior art, the methods of the present invention are simple and easy to automate and involve short exposure to heat. No carrier gas is required as the evaporated solvent itself serves to carry the vaporised component through the narrow bore vessel. Following vaporisation, the vaporised component can be directed into a collection vessel, which can be sealed or open as required, and by keeping the collection vessel below the boiling point of the solvent, condensation by nature will prevent built up of pressure. The vaporised component can be led into a collection vessel of choice using valves, which greatly simplifies automation. As there is no carrier gas or reduced pressure in the system effective collection of the vaporised component is ensured. The method is highly robust as the sensitivity to temperature changes is limited and there is no need to tightly control gas flow. As the exposure of the [$^{18}$F] fluoride solution to heat occurs over a very short time-period decomposition should be minimal. An additional benefit is the speed with which [$^{18}$F]fluoride drying can be achieved, which only is limited to the rate of vaporisation. Finally, as the total volume of the apparatus is small, loss of radioactivity in the process is kept to a minimum.

The narrow bore vessel preferably takes the form of a tube with a narrow bore, for example an HPLC loop with no solid support packing. The internal diameter of the narrow bore vessel is usually in the range of about 1 micrometer to 1.5 mm, preferably 40 to 200 μm. It is particularly convenient if the narrow bore vessel is open at both ends so that the crude mixture can be flushed through.

The length of the narrow bore vessel will be chosen such that it is long enough for the purification to be effected but is sufficiently short to minimise residence time in the vessel. A convenient length for the narrow bore vessel is from about 5 cm to 50 cm long, more usually 5 cm to 20 cm and typically about 15 cm.

Suitably, the cationic counterion present in the [$^{18}$F]fluoride solution is selected from rubidium, cesium, tetraalkylammonium salts, and potassium complexed by a cryptand such as 4,7,13,16,21,24-hexaoxa-1,10-diazabicyclo [8,8,8] hexacosan (tradename Kryptofix 222). The use of potassium complexed by a cryptand such as 4,7,13,16,21,24-hexaoxa-1,10-diazabicyclo [8,8,8] hexacosan is particularly suitable.

Suitable solvents for use in the methods of the invention include acetonitrile, ethanol, tetrahydrofuran, diethylether, dichloromethane, chloroform, acetone, ethyl acetate, dimethylformamide.

In one embodiment of the invention, restrictor tubes at inlet and outlet of the narrow bore vessel may be used to promote the build-up of pressure necessary for generating the vaporised component. These tubes have a smaller inner diameter (typically 0.1-0.2 mm) than the narrow bore vessel. By choosing a longer restrictor tube for the sample inlet compared with the outlet, the flow of the distilling vaporised component will be guided during feeding-in of the crude mixture.

The elevated temperature used in the method is suitably in the range of 80° C. to 200° C., preferably 90° C. to 200° C. In one aspect of the invention, the elevated temperature used is such that the solvent reaches a supercritical state.

The [$^{18}$F]fluoride solution may be introduced into the narrow bore vessel by any convenient means, for example by injection, applying external pressure to the narrow bore vessel using pressurised gas or heating the narrow bore vessel to generate vapour. The flow rate of the [$^{18}$F]fluoride solution is preferably in the range 0.1 to 1.0 ml/min.

Following the [$^{18}$F]fluoride drying method of the invention, the [$^{18}$F]fluoride may be removed from the narrow bore vessel by passing a suitable solvent down its length, alternatively the adsorbed [$^{18}$F]fluoride may be used to perform a radiofluoridation reaction within the narrow bore vessel.

In a further aspect of the invention, there is provided a method as described above, which comprises the further step of (iii) reaction of the resulting dried [$^{18}$F]fluoride in a narrow bore vessel to form a radiolabelled compound. The narrow bore vessel used in step (iii) may be the same narrow bore vessel as used in step (i), or a separate narrow bore vessel in fluid connection therewith.

The narrow bore vessel may be cleaned by passing a suitable solvent down its length, alternatively disposable narrow bore vessels may be used.

According to a further aspect of the invention, there is provided an apparatus for drying [$^{18}$F]fluoride using the methods described above which comprises a narrow bore vessel containing a [$^{18}$F]fluoride solution, said [$^{18}$F]fluoride solution comprising water, a solvent, [$^{18}$F]fluoride, and a cationic counterion. Suitably, the narrow bore vessel is a tube with a narrow bore, such as an HPLC loop with no solid support packing. More suitably, the internal diameter of the narrow bore vessel is in the range of about 1 micrometer to 1.5 mm, preferably 40 to 200 μm.

The following example is described with reference to FIG. 1 which is a schematic of an apparatus suitable for performing a method according to the invention.

EXAMPLE

Drying [$^{18}$F]Fluoride Using Distillation

Distillation Apparatus

A scheme of the apparatus is shown in FIG. 1. The tubing material consists of standard HPLC parts. Restrictors 1 and 2 are narrow bore stainless steel tubes (i.d. 0.127 mm) of 13.5 cm and 7.0 cm length, respectively. The HPLC injector loop 3 has a capacity of 1.0 mL. The electrical heating cylinder 4 can be heated up to 200° C. by a heating module 5 with a temperature control unit 6. The gas/liquid stream was directed into a trapping vial of water (1.0 mL) 8 with a vent line 9.

Fluorine-18 was produced with a cyclotron using the $^{18}$O (p, n)$^{18}$F reaction and $^{18}$O enriched water (30%) as target material. A stock solution consisting of caesium carbonate (10 mg), water (0.05 ml), acetonitrile (0.5 ml), and water containing fluorine-18 (0.44 ml, 3.3 mCi, 123 MBq) was prepared.

A syringe (1 ml, Hamilton, Gastight) 7 was filled with stock solution (0.1 mL) and air (0.9 ml). The solution was pumped with 0.2 ml/min into the pre-heated apparatus (150° C.). The drying process was completed after 4.5 minutes. The distilled mixture of acetonitrile and water contained no [$^{18}$F]fluoride contamination. Thus, more than 99% of the starting $^{18}$F had been retained and dried.

The experiment was repeated twice using increased volumes of stock solution (0.2 mL and 0.4 mL). The $^{18}$F contamination of the trapping vial was less than 0.1% in both cases.

What is claimed is:

1. Apparatus for drying [$^{18}$F]fluoride which comprises a narrow bore vessel containing a [$^{18}$F]fluoride solution, said [$^{18}$F]fluoride solution comprising water, a solvent, [$^{18}$F]fluoride, and a cationic counterion.

2. Apparatus according to claim 1 wherein the narrow bore vessel is a tube with a narrow bore, such as an HPLC loop with no solid support packing.

3. Apparatus according to claim 1 wherein the internal diameter of the narrow bore vessel is in the range of about 1 micrometer to 1.5 mm, preferably 40 to 200 μm.

\* \* \* \* \*